(12) United States Patent
Tremblay-Meunier et al.

(10) Patent No.: US 11,760,676 B2
(45) Date of Patent: Sep. 19, 2023

(54) METHOD OF EXTRACTING WATER FROM SLUDGE USING MAGNETIC TREATMENT

(71) Applicant: MEUNIER TECHNOLOGIES INC., Saint-Eustache (CA)

(72) Inventors: Vincent Tremblay-Meunier, Saint-Eustache (CA); Frédéric Monette, Montréal (CA)

(*) Notice: Subject to any disclaimer, the term of this patent is extended or adjusted under 35 U.S.C. 154(b) by 56 days.

(21) Appl. No.: 17/269,017

(22) PCT Filed: Aug. 16, 2019

(86) PCT No.: PCT/CA2019/051118
§ 371 (c)(1),
(2) Date: Feb. 17, 2021

(87) PCT Pub. No.: WO2020/034040
PCT Pub. Date: Feb. 20, 2020

(65) Prior Publication Data
US 2021/0309553 A1    Oct. 7, 2021

Related U.S. Application Data (60) Provisional application No. 62/721,670, filed on Aug. 23, 2018, provisional application No. 62/719,275, filed on Aug. 17, 2018.

(51) Int. Cl.
| | | |
|---|---|---|
| C02F 11/15 | (2019.01) | |
| C02F 11/147 | (2019.01) | |
| C02F 11/143 | (2019.01) | |
| C02F 11/148 | (2019.01) | |

(52) U.S. Cl.
CPC ............. *C02F 11/15* (2019.01); *C02F 11/143* (2019.01); *C02F 11/147* (2019.01); *C02F 11/148* (2019.01)

(58) Field of Classification Search
None
See application file for complete search history.

(56) References Cited

U.S. PATENT DOCUMENTS

| | | | |
|---|---|---|---|
| 5,230,809 A | 7/1993 | Roslonski | |
| 6,478,955 B1 * | 11/2002 | Saho | ........................ C02F 1/48 210/182 |

(Continued)

FOREIGN PATENT DOCUMENTS

| | | |
|---|---|---|
| CN | 101301637 A | 11/2008 |
| CN | 202038962 U | 11/2011 |
| CN | 103553292 B | 10/2014 |

(Continued)

OTHER PUBLICATIONS

Li et al., Optimization of Polyaluminum Chloride-Chiotsan Flocculant for Treating Pig Biogas Slurry Using the Box-Behnken Response Surface Method, 16 Int. J. Environ. Res. Public Health, 1, 2 (2019). (Year: 2019).*

(Continued)

*Primary Examiner* — Magali P Slawski
*Assistant Examiner* — Brad Gordon (57) ABSTRACT

A method of extracting water from sludge, wherein the sludge includes a magnetic ballast, wherein the sludge is positioned on an interface. It includes applying a magnetic treatment to the magnetically-ballasted sludge to extract water from the sludge.

14 Claims, 2 Drawing Sheets

(56) References Cited

U.S. PATENT DOCUMENTS

2005/0126976 A1 6/2005 Yoda et al.
2016/0221845 A1* 8/2016 Cort .................. C02F 1/481

FOREIGN PATENT DOCUMENTS

| | | | |
|---|---|---|---|
| CN | 105399302 | A | 3/2016 |
| CN | 106186255 | A | 12/2016 |
| EP | 1097905 | A2 | 5/2001 |
| JP | S5314469 | A | 2/1978 |
| JP | 2005111424 | A | 4/2005 |
| JP | 2014018763 | A | 2/2014 |
| KR | 100489048 | B1 | 5/2005 |
| WO | 2018/045543 | A1 | 3/2018 |

OTHER PUBLICATIONS

Corresponding Chinese application 201980068329.2 Office Action dated Aug. 3, 2022.
Corresponding European application 19850023.3 extended search report dated Mar. 25, 2022.
Bien J B et al., Magnetic and chemical conditioning of sewage sludge. Environment protection engineering, vol. 30, No. 4. Jan. 1, 2004, pp. 183-187.
Ying Qi et al., Application of filtration aids for improving sludge dewatering properties A review. Chemical Engeneering Journal, Elsevier, Amsterdam, NL, vol. 171, No. 2, Apr. 13, 2011, pp. 373-384.
International application No. PCT/CA2019/051118 International Search Report dated Nov. 8, 2019.
International application No. PCT/CA2019/051118 Search Strategy dated Nov. 8, 2019.
International application No. PCT/CA2019/051118 Written Opinion of the International Searching Authority dated Nov. 8, 2019.
Hrut et al., "Iron compounds and a magnetic field as the conditioning agents for municipal sewage sludge". E38 Web Conf., Jul. 30, 2018 (Jul. 30, 2018), vol. 4s(00022), Retrieved from the Internet: Nov. 6, 2019 (Nov. 6, 2019) <https://doi.org/10.1051/e3sconf/20184500022>.

* cited by examiner

Fig. 1

Fig. 2

METHOD OF EXTRACTING WATER FROM SLUDGE USING MAGNETIC TREATMENT

The present application claims priority from U.S. provisional patent application No. 62/719,275 filed on Aug. 17, 2018, incorporated by reference herein, and U.S. provisional patent application No. 62/721,670 filed on Aug. 23, 2018, incorporated by reference herein.

TECHNICAL FIELD

The present application relates to the field of water treatment, and more particularly to removal of water from sludge during the course of a water treatment process.

BACKGROUND

It is well known to use water treatment clarifiers during the water treatment process. The process undertaken during the water treatment clarification usually involves a coagulation-flocculation stage.

Several separation methods may be used in clarifiers such as settling, flotation and/or magnetic separation. Settling and flotation are the most widely used separation techniques. In order to increase the capacity of these clarifiers, technologies have emerged focusing on higher flotation and settling rates. For example, settling rates have been improved by ballasted flocculation using high specific weight materials such as micro-sands or magnetites and/or by using a lamella design (i.e. a lamella clarifier).

Although these clarifiers perform well in terms of treatment capabilities, they produce low TS (total solid) content sludge (e.g. typically a 0.5-4% TS content sludge). Low TS content equates to a sludge where a vast majority of its composition is water. Water needs to be extracted from the sludge in order to reduce the sludge volume and obtain a final sludge cake that can be disposed. The process of separating and extracting water from the sludge is realised by a sludge treatment process.

Sludge treatment is generally a heavily mechanized process involving a series of large machines (e.g. filter press, band filter, centrifuge, etc.), the equipment used namely to remove water from the sludge. Not only do these machines require large capital investment (due to their size and complexity) but they also require considerable maintenance and incur important operation cost in a water treatment plant.

Moreover, the removal of water from sludge produced during water treatment usually requires separate equipment in order to increase the TS content of the sludge and decrease its volume.

There is an important need for clarifier technology capable of productive producing high TS content sludge with a high solid capture rate (resulting in good clarity of the extracted water) that would minimize or eliminate the requirement of a complex sludge treatment process while maintaining sufficient water treatment capabilities.

SUMMARY

It has been discovered that magnetic treatment (e.g. one or more magnetic pulses) can be used on sludge (e.g. a sludge cake) obtained during the separation phase of solid particulates found in water to further increase the TS content of the sludge and reduce water content contained therein.

The magnetic treatment is applied to sludge that is ballasted with a magnetic compound (e.g. a magnetic ballast). Water is removed form the sludge cake as a result of the magnetic treatment, the water free to leave the sludge and flow out, e.g., through an interface.

A broad aspect is a method of extracting water from sludge, wherein the sludge includes a magnetic ballast, and wherein the sludge rests on an interface. The method includes applying one or more magnetic pulses to the magnetically-ballasted sludge to extract water from the magnetically-ballasted sludge.

In some embodiments, the one or more magnetic pulses may be generated by reducing a strength of a magnetic field applied to the magnetically-ballasted sludge and increasing the strength of the magnetic field applied to the magnetically-ballasted sludge, the reducing and the increasing performed one or more times.

In some embodiments, the strength of the magnetic field may be reduced to zero or near zero during the reducing.

In some embodiments, the strength of the magnetic field may be increased by moving at least one magnet closer to the magnetically-ballasted sludge and the strength of the magnetic field may be reduced by distancing the at least one magnet away from the magnetically-ballasted sludge.

In some embodiments, the strength of the magnetic field may be reduced by turning off or reducing current flowing through at least one electromagnet, and wherein the strength of the magnetic field may be increased by turning on or increasing current flowing through the at least one electromagnet.

In some embodiments, the magnetic treatment may include varying a magnetic field output of one or more electromagnets.

In some embodiments, the one or more magnetic pulses may include more than one magnetic pulse.

In some embodiments, the one or more magnetic pulses may include more than four magnetic pulses.

In some embodiments, the sludge may include a flocculant.

In some embodiments, the sludge may be a sludge cake.

Another broad aspect is a water treatment process comprising the method of extracting water from sludge as defined herein.

Another broad aspect is a sludge cake having a reduced water content, wherein the water content of the sludge cake is reduced by performing the method as defined herein.

Another broad aspect is a sludge cake having an increased TS content, wherein the TS content of the sludge cake is increased by performing the method as defined herein.

Another broad aspect is a method of extracting water from sludge during a treatment process of water or sludge. The method includes adding a magnetic ballast and a flocculant to water or sludge, forming flocs in the water or the sludge. The method includes applying a magnetic field to the water or the sludge, the magnetic field drawing the flocs to an interface, wherein a ballasted sludge cake is formed on the interface. The method includes applying one or more magnetic pulses to the magnetically-ballasted sludge cake to extract water from the magnetically-ballasted sludge cake.

In some embodiments, the one or more magnetic pulses may be generated by reducing a strength of a magnetic field applied to the magnetically-ballasted sludge cake and increasing the strength of the magnetic field applied to the magnetically-ballasted sludge cake, the reducing and the increasing performed one or more times.

In some embodiments, the strength of the magnetic field may be reduced to zero or near zero during the reducing.

In some embodiments, the strength of the magnetic field may be increased by moving at least one magnet closer to the magnetically-ballasted sludge cake and the strength of the magnetic field may be reduced by distancing the at least one magnet away from the magnetically-ballasted sludge cake.

In some embodiments, the strength of the magnetic field may be reduced by turning off or reducing current flowing through at least one electromagnet, and wherein the strength of the magnetic field may be increased by turning on or increasing current flowing through the at least one electromagnet.

In some embodiments, the one or more magnetic pulses may include more than one magnetic pulse.

In some embodiments, the one or more magnetic pulses may include more than four magnetic pulses.

Another broad aspect is a method of extracting water from sludge, wherein the sludge includes a magnetic ballast, and wherein the sludge rests on an interface including extracting water from the magnetically-ballasted sludge through magnetic treatment of the magnetically-ballasted sludge.

In some embodiments, the magnetic treatment may include at least one of moving at least one of one or more magnets generating a magnetic field; and one or more electromagnets generating a magnetic field with respect to the magnetically-ballasted sludge cake; moving the magnetically-ballasted sludge cake with respect to the at least one of one or more magnets generating a magnetic field; and one or more electromagnets generating a magnetic field; and varying at least one of the intensity, orientation and configuration of a magnetic field.

In some embodiments, the magnetic treatment may include moving at least one of one or more magnets generating a magnetic field; and one or more electromagnets generating a magnetic field with respect to the magnetically-ballasted sludge cake.

In some embodiments, the moving may be at least one of translational and rotational.

In some embodiments, the magnetic treatment may include the varying at least one of the intensity, orientation and configuration of a magnetic field.

In some embodiments, the varying may be repeated more than once.

In some embodiments, the varying may be repeated more than four times.

In some embodiments, the method may include adding a coagulant to the water or the sludge prior to the applying a magnetic field.

In some embodiments, the coagulant may consist of one or more metallic coagulants, organic coagulants, or a combination thereof.

In some embodiments, the flocculant may consist of one or more anionic polymer, cationic polymer, inorganic flocculant, or a combination thereof.

In some embodiments, the method may include, wherein the applying the magnetic field results in separating the ballasted sludge cake from liquid, prior to applying one or more magnetic pulses, separating the ballasted sludge cake from the liquid.

Another broad aspect is a sludge cake with a reduced water content obtained during a water treatment process, the sludge cake with a reduced water content obtained by performing the method as defined herein.

Another broad aspect is a sludge cake with an increased TS content obtained during a water treatment process, wherein the sludge cake with the increased TS content is obtained by performing the method as defined herein.

Another broad aspect is a good clarity of sludge-extracted water resulting in a high solids capture rate obtained by performing the method of extraction of water from sludge using a conditioning agent as defined herein.

Another broad aspect is a method of extracting water from sludge during a treatment process of water or sludge. The method includes adding a magnetic ballast to water or sludge. The method includes applying a magnetic field to the water or the sludge, the water or the sludge containing flocs, the magnetic field drawing the flocs to an interface, wherein a ballasted sludge cake is formed on the interface. The method includes applying one or more magnetic pulses to the magnetically-ballasted sludge cake to extract water from the magnetically-ballasted sludge cake.

Another broad aspect is a method of extracting water from sludge during a treatment process of water or sludge. The method includes adding a magnetic ballast and a flocculant to water or sludge, forming flocs in the water or the sludge; applying a magnetic field to the water or the sludge, the magnetic field drawing the flocs to an interface, wherein a ballasted sludge cake is formed on the interface; and extracting water from the magnetically-ballasted sludge cake by applying a magnetic treatment to the magnetically-ballasted sludge cake.

In some embodiments, wherein the water is flocculated, and the magnetic ballast may be added to the flocculated water.

In some embodiments, the magnetic ballast may be added to the water prior to during or after an addition of a flocculant.

A broad aspect of the present disclosure is a method of extracting water from sludge during a treatment process of water or sludge. The method includes adding a magnetic ballast and a flocculant to water or sludge, wherein ballasted flocs are formed in the water or the sludge. The method includes applying a magnetic field to the water or the sludge, the magnetic field drawing the ballasted flocs to an interface, wherein a ballasted sludge cake is formed on the interface, the ballasted sludge cake separate from treated water. The method includes adding a conditioning agent to the ballasted sludge cake separated from the treated water. The method includes applying one or more magnetic pulses to the ballasted and conditioned sludge cake to extract water from the ballasted and conditioned sludge cake.

In some embodiments, the one or more magnetic pulses may be generated by reducing a strength of a magnetic field applied to the ballasted sludge cake and increasing the strength of the magnetic field applied to the ballasted sludge cake, the reducing and the increasing performed one or more times.

In some embodiments, the strength of the magnetic field may be reduced to zero or near zero during the reducing.

In some embodiments, the strength of the magnetic field may be increased by moving at least one magnet closer to the ballasted sludge cake and the strength of the magnetic field may be reduced by distancing the at least one magnet away from the ballasted sludge cake.

In some embodiments, the strength of the magnetic field may be reduced by turning off or reducing current flowing through at least one electromagnet, and wherein the strength of the magnetic field may be increased by turning on or increasing current flowing through the at least one electromagnet.

In some embodiments, the one or more magnetic pulses may include more than one magnetic pulse.

In some embodiments, the one or more magnetic pulses may include more than four magnetic pulses.

In some embodiments, the method may include adding a coagulant to the water or the sludge prior to the applying a magnetic field.

In some embodiments, the concentration of magnetic ballast in the magnetically-ballasted sludge is of less than 100 g of magnetic ballast in a liter of the magnetically-ballasted sludge.

In some embodiments, the concentration of magnetic ballast in the magnetically-ballasted sludge is of less than 75 g of magnetic ballast in a liter of the magnetically-ballasted sludge.

In some embodiments, the concentration of magnetic ballast in the magnetically-ballasted sludge is of less than or equal to 20 g of magnetic ballast in a liter of the magnetically-ballasted sludge.

In some embodiments, the concentration of magnetic ballast in the magnetically-ballasted sludge is of less than or equal to 10 g of magnetic ballast in a liter of the magnetically-ballasted sludge.

In some embodiments, the coagulant used for water treatment may consist of one or more metallic coagulants; organic coagulants; and a combination thereof.

In some embodiments, the flocculant used for water treatment consists of one or more anionic polymer; cationic polymer; inorganic flocculant; and a combination thereof.

In some embodiments, the conditioning agent may be added to a surface of the ballasted sludge cake.

In some embodiments, the conditioning agent may be added to the ballasted sludge cake by at least one of injection, dripping, misting and nebulising.

In some embodiments, the conditioning agent may be added to the magnetically-ballasted sludge through the interface (e.g. through the openings, such as the pores, of the interface).

In some embodiments, the conditioning agent may be added before and/or during, and in some examples, also after, the magnetic pulses. The conditioning agent may be added more than once at more than one point during the process.

In some embodiments, the conditioning agent may be at least one of an anionic polymer, a cationic polymer and an inorganic polymer.

In some embodiments, the conditioning agent may be a cationic polymer.

In some embodiments, the method may include, after the applying one or more magnetic pulses, recovering the magnetic ballast using magnetic separation.

Another broad aspect is a sludge cake with a reduced water content obtained during a water or sludge treatment process, the sludge cake with a reduced water content obtained by performing the method as defined herein.

Another broad aspect is a sludge cake with an increased TS content obtained during a water or sludge treatment process, the sludge cake with the increased TS content is obtained by performing the method as defined herein.

Another broad aspect is a method of extracting water from sludge, wherein the sludge includes a magnetic ballast, and wherein the sludge rests on an interface. The method includes adding a conditioning agent to the ballasted sludge and applying one or more magnetic pulses to the magnetically-ballasted and conditioned sludge to extract water from the magnetically-ballasted and conditioned sludge.

In some embodiments, the one or more magnetic pulses may be generated by reducing a strength of a magnetic field applied to the magnetically-ballasted and conditioned sludge and increasing the strength of the magnetic field applied to the magnetically-ballasted and conditioned sludge, the reducing and the increasing performed one or more times.

In some embodiments, the strength of the magnetic field may be reduced to zero or near zero during the reducing.

In some embodiments, the strength of the magnetic field may be increased by moving at least one magnet closer to the magnetically-ballasted and conditioned sludge and the strength of the magnetic field may be reduced by distancing the at least one magnet away from the magnetically-ballasted and conditioned sludge.

In some embodiments, the strength of the magnetic field may be reduced by turning off or reducing current flowing through at least one electromagnet, and wherein the strength of the magnetic field may be increased by turning on or increasing current flowing through the at least one electromagnet.

In some embodiments, the one or more magnetic pulses may include more than one magnetic pulse.

In some embodiments, the one or more magnetic pulses may include more than four magnetic pulses.

In some embodiments, the conditioning agent may be added to a surface of the magnetically-ballasted and conditioned sludge.

In some embodiments, the conditioning agent may be added to the magnetically-ballasted and conditioned sludge by at least one of injection, dripping, misting and nebulising.

In some embodiments, the conditioning agent may be at least one of an anionic polymer, a cationic polymer and an inorganic polymer.

In some embodiments, the conditioning agent may be a cationic polymer.

In some embodiments, the method may include, after the applying one or more magnetic pulses, recovering the magnetic ballast using magnetic separation.

Another broad aspect is a sludge cake with a reduced water content obtained by performing the method as defined herein.

Another broad aspect is a sludge cake with an increased TS content obtained by performing the method as defined herein.

Another broad aspect is a water treatment process comprising the method of extracting water from sludge as defined herein.

Another broad aspect is a method of extracting water from sludge, wherein the sludge includes a magnetic ballast, and wherein the sludge rests on an interface. The method includes adding a conditioning agent to the ballasted sludge and applying magnetic treatment to the magnetically-ballasted and conditioned sludge to extract water from the magnetically-ballasted and conditioned sludge.

BRIEF DESCRIPTION OF THE DRAWINGS

The invention will be better understood by way of the following detailed description of embodiments of the invention with reference to the appended drawings, in which.

DETAILED DESCRIPTION

Figure 1:
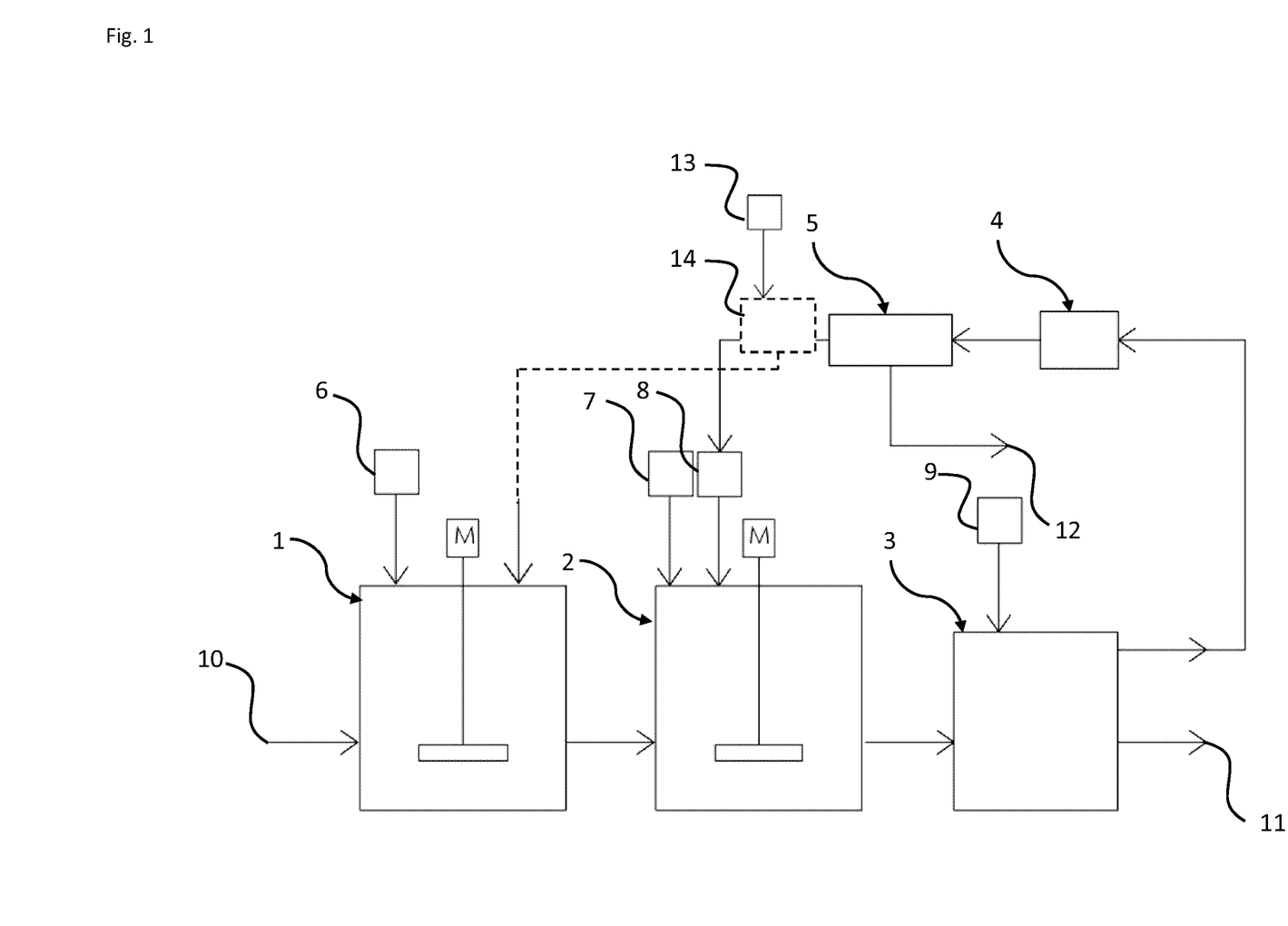
FIG. 1 is a block diagram of an exemplary water treatment system.

Reference is now made to FIG. 1, illustrating an exemplary water treatment system employing the magnetic treatment water removal method as explained herein, combinable with the addition of a conditioning agent to the sludge cake. It will be understood that even though the present description, for exemplary purposes, relates to the use of the magnetic treatment method to remove water from sludge during a water treatment clarification process, it will be understood that the magnetic treatment method, and, in some examples, the addition of a conditioning agent, may also be employed for other uses where water is to be removed from sludge containing magnetic particles (e.g. mining separation processes involving a mining magnetic sludge cake from, e.g., an iron/ore separation and/or recovery from a mining slurry, etc.)

It will be understood that in the present application, by "sludge" it includes a viscous or semi-liquid mixture containing solid particulates, e.g., suspended in water (e.g. a slurry).

Therefore, as described with respect to FIG. 1, a water treatment clarification process including a coagulation step, a ballasted (using metal particles such as iron particles, magnetic particles, etc.) flocculation step and a magnetic separation step may further employ the water extraction process explained herein using magnetic treatment (e.g. one or more magnetic pulses—where the strength of the magnetic field is varied at a given point of the sludge cake and time).

Coagulation

In some examples, the water treatment process may have a coagulation stage.

The coagulation stage 1 involves adding a coagulant 6 (e.g. metallic coagulant(s) such as ferric chloride, aluminum sulfate, polymeric aluminium or iron, etc.; organic coagulant (s) such chitosan, starch products, etc.) to the effluent water 10 during a vigorous hydraulic mixing. This combination results in the formation of small aggregates (i.e. micro-flocs) that may be separated from the treated water.

Ballasted Flocculation

The ballasted flocculation stage 2 involves adding a flocculant 7 (e.g. an organic flocculant such as an anionic polymer, cationic polymer, etc.; inorganic flocculant such as activated silica, silicoaluminate, etc.) and a ballast 8 (e.g. metal particles such as iron particles, magnetic particles, etc.) to the coagulated water during hydraulic mixing. This stage results in the formation of bigger flocs composed of the ballast, aggregates and solids linked together by the flocculant.

By "ballast", it will be understood that it is meant a substance that is present in the water or slurry that can be used to control the flocs (e.g. draw or repel the flocs to an interface by using a magnetic field as explained herein). For instance, in some embodiments, such as in mining applications, the ballast may not have to be added as it may already be present within the extracted ore slurry (e.g. ferromagnetic particles contained in the ore slurry). As such, a magnetic ballast is a ballast that is or can be actuated by a magnetic field (magnetic attraction) (e.g. attracted to a magnetic).

A magnetically-ballasted sludge or magnetic ballasted sludge is defined as a sludge that contains a magnetic ballast such that the flocs of the magnetically-ballasted sludge are controlled by the magnetic ballast that are influenced by a magnetic field.

Separation & Dehydration

The separation and dehydration stage 3 may be as follows.

First, the ballasted flocs in water (formed by the coagulation-flocculation process) are attracted by magnets (submerged or not submerged)(e.g., magnetic coils) onto a surface of a porous or non-porous interface (separating the magnets from the attracted ballasted flocs e.g. membrane, metallic or non-metallic sheet, metallic or non-metallic drum). The magnetic field allows the formation of a ballasted-sludge cake on the interface. This magnetic field is generated by, e.g., one or more permanent magnets (e.g. neodymium iron boron), electromagnets, or one or more sets of permanent magnets or electromagnets, etc.

The interface is used to support the sludge. In some embodiments, the interface may be the surface of an electromagnet. In some embodiments, the interface may have a smooth surface finish, a rough surface finish or present organised on non organised grooves. In some embodiments, water (e.g. extracted water) may be able to flow through the interface. The interface can be oriented in any direction such as vertical horizontal or with an inclination. In other embodiments, the interface may be further used to separate the source of the magnetic field from the ballasted-sludge to avoid any contact between the two (to avoid magnet clogging). The movement of the interface allows the ballasted-sludge cake to be removed from the processed water stream as the magnetic field is applied, drawing the sludge to the interface. In the case of an emerged magnet, the movement of the "ballasted-sludge cake/interface/magnets" system movement causes the "ballasted-sludge cake/interface/magnets" system to emerge out from the water.

In some embodiments, further water treatment may be done to the sludge extracted water.

The ballasted-sludge cake formed on the interface is composed of: 1) metal particles (added during water treatment process 2); 2) treatment sludge and 3) water. At this point, even if the sludge is now located outside the water stream, it is still mainly composed of water (typically in the TS content range of 0.5-4%).

In some embodiments, an air stream maybe used to further promote the extraction of water located at surface the ballasted-sludge cake. The air stream may be introduced before, during or after the magnetic treatment with or without the use of a conditioning agent.

Magnetic treatment may then be performed on the ballasted-sludge cake.

A "magnetic treatment" (e.g. magnetic pulses) is defined as varying a magnetic field relative to the magnetic particles or magnetic ballasted sludge at a certain point and time. This variation may be in the intensity of the magnetic field, its orientation or its configuration. This variation of a magnetic field at the certain point and time may be created, e.g., by any form of magnet motions or any form of variation of the magnetic field generated by the magnets or electromagnets. The magnetic treatment causes the sludge cake to release trapped water. The magnetic treatment (e.g. through magnetic pulses) is required to promote movement that results in evacuation of water from the cake structure and consequently improve the cake's TS content.

A magnetic pulse (where applying one or more magnetic pulses is a form of magnetic treatment) is a variation of the strength of the magnetic field at a given point over a certain period.

Figure 2:
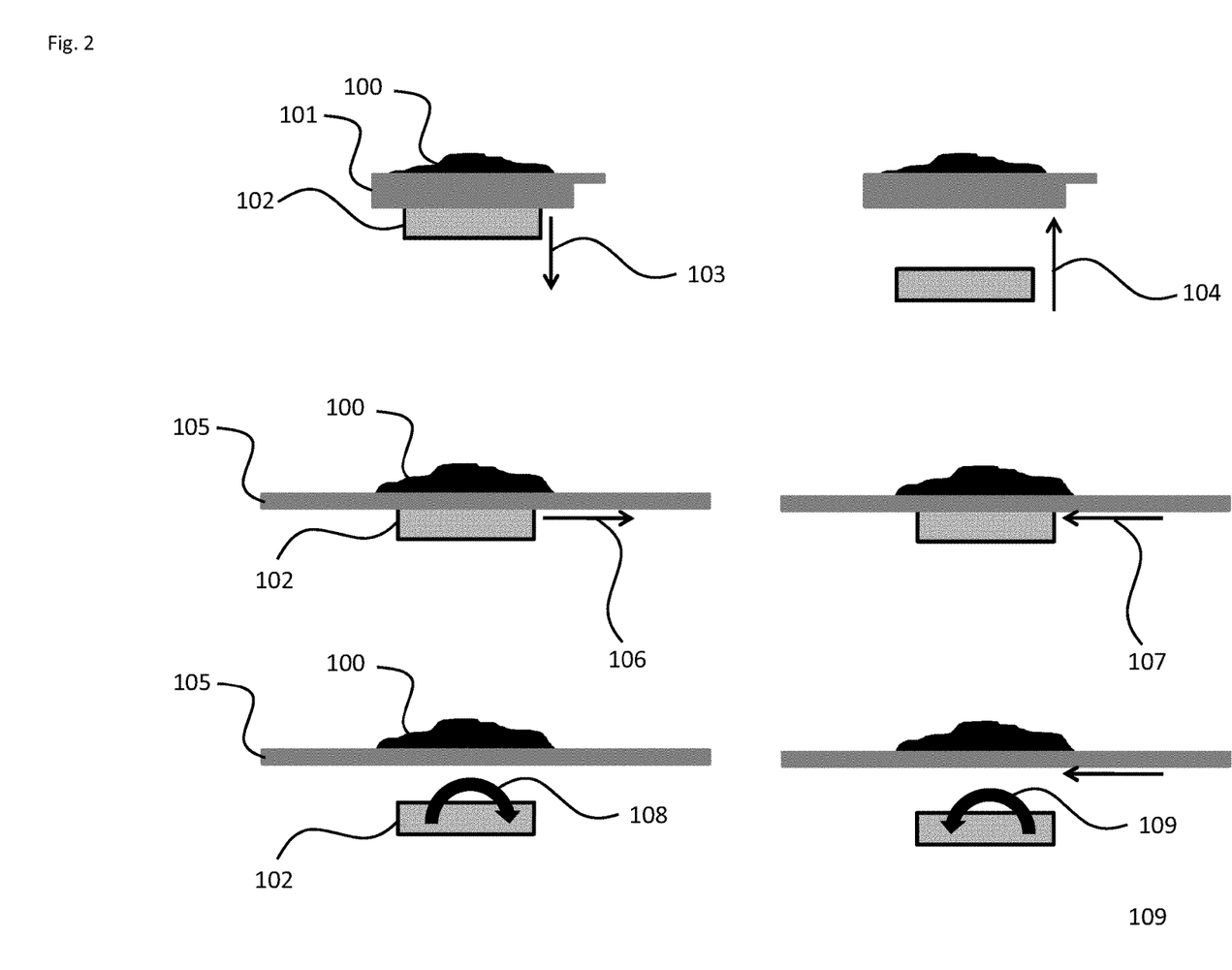
FIG. 2 is a drawing of exemplary steps of using magnetic treatment to remove water from a sludge cake, the magnet undergoing different movement with respect to the sludge cake to vary the magnetic field exerted on the magnetic ballast in the magnetically-ballasted (and in some examples conditioned) sludge cake.

With respect to FIG. 2, the magnetic pulses were performed in a laboratory by distancing 103 the magnet 102 from a laboratory cup 101 containing the ballasted-sludge cake 100 in order for the magnetic field to have a negligible (or lower) effect on the metal particles in the ballasted-sludge cake. The permanent magnet 102 was then moved again closer to the interface 104. In this exemplary study, it was shown that the result of several pulses (more than one pulse) allowed the sludge cake TS content to be increased to 7.2%. The results are reproduced below in Table 1.

TABLE 1

Results of magnetic treatment on sludge-cake volume

| Water treatment with cationic polymer | Conditions | | |
|---|---|---|---|
| | TS content (dry solids) | Approximate sludge-cake volume reduction | Approximate sludge-cake water volume reduction |
| Alum coagulant (water treatment): 14.5 mg Al/L | | | |
| Cationic polymer (water treatment): 1.0 mg/L | | | |
| Iron particles (water treatment): 5 g/L | | | |
| Initial sludge cake (without magnetic pulse) | 3.1% | 57% | 59% |
| Pulses: more than 4 magnetic pulses applied | 7.2% | | |

As shown by the results featured in Table 1, the sludge cake subject to water removal due to the movement of the interface (without the use of the magnetic pulse) resulted in a 3.1% TS content (TC). When the sludge cake is then subjected to the magnetic pulses, the TS content of the sludge cake is increased to 7.2%, representing an increase in 4.1% of the TS content of the sludge cake. This equates to a volume reduction of 57% between before and after the sludge cake is subject to the magnetic pulses.

As shown in FIG. 2, other exemplary kinds of magnetic treatment were performed by translation movements 106 and 107 of the magnet and rotation movements 108 and 109.

In other words, magnetic treatment (e.g. magnetic pulses) may involve one or more of the following: moving the one or more magnets or the one or more electromagnets or the magnetically-ballasted sludge cake with respect to one another (e.g. translational movement, rotational movement, curvilinear movement, a combination thereof, etc.), where the movement may be repetitious; or by varying (e.g. repetitiously) the intensity, orientation and configuration of the magnetic field that is actuating the magnetic ballast of the magnetically-ballasted sludge cake (e.g. the variation may follow different wave forms—e.g. sine, square, triangle, etc.)

In some embodiments, the magnetic treatment (e.g. magnetic pulses) may be performed by e.g., distancing the magnets from the surface of the interface such that the magnetic field has a negligible (or lower) effect on the metal particles in the ballasted-sludge cake. The complete process typically takes a few seconds but may be shorter or longer. The permanent magnets are then moved back close to the interface. The displacing of the magnets towards and away from the sludge cake creates magnetic pulses.

In some embodiments, the magnetic field pulse step induced by e.g. electromagnets may consist of stopping (or reducing) the supply of current to the electromagnets in order for the magnetic field to have a negligible (or lower) effect on the metal particles in the ballasted-sludge cake. The complete process typically takes a few seconds but may be shorter or longer. The electrical supply of the electro-magnet is then reactivated or increases. The turning on and off (or increasing and lowering) of the current supplied to the electromagnets results in the creation of the magnetic pulses, as the magnetic field is equally created then the strength reduced (or caused to disappear).

During (and after) the magnetic pulsing, the interface allows the extracted water to be returned back into the process water stream (and then to the treatment effluent 11). This drainage may be done through the interface or on the interface. The dehydrated cake is then sent to the ballast recovery process. In some embodiments, the extracted water may be drained back directly into the process water stream.

The magnetic pulse may be performed by an electromagnet by varying its magnetic field output intensity, orientation or configuration. For instance, the magnetic field output variation may be obtained by varying the electrical current input, by moving the electromagnet core relative to the coils or by varying the coils configuration (e.g. the variation may follow different wave forms—e.g. sine, square, triangle, etc.).

After the magnetic separation 3, the treated water will flow through the treatment effluent 11.

It will be understood that in some examples, the magnetic pulses may instead be created by changing the direction of the magnetic field. For example, where the source of the magnetic field is one or more magnetic coils, the direction of the magnetic field may be changed by inversing the direction of the electric current flowing through the coils. As such, sequentially reversing the magnetic fields several times may result in the creation of magnetic pulses.

Sludge Conditioning

Prior to sludge conditioning, once the sludge is drawn to the interface by the magnet, the treated water that is separated from the sludge cake is removed (e.g. the interface having the sludge cake formed thereon is removed from the remaining water, now treated) leaving the sludge cake with a given TS content.

It has been demonstrated that, prior to magnetically treating the sludge cake, and once the sludge cake has been separated from the treated water, the addition of a conditioning agent may significantly increase water removal from the sludge cake and increase the TS content of the sludge cake. The use of the conditioning agent also improves the clarity of the extracted water and results in high solids capture rate.

The sludge conditioning is achieved using a sludge conditioning agent. This sludge-conditioning agent includes a product (organic or inorganic flocculants such as organic polymer, polyelectrolytes, starch, iron-based coagulant, aluminum-based coagulant, lime, etc.) that promotes the formation of a porous, free draining cake structure in order to improve the TS content of the ballasted-sludge cake. For instance, the sludge-conditioning agent may be a cationic polymer, such as SUPERFLOC C-446™. In some embodiments, the sludge conditioning agent may be an anionic polymer, an inorganic polymer, etc.

In an exemplary embodiment, this sludge-conditioning agent 9 is added as a liquid solution to the sludge cake before the magnetic treatment, and/or at any other time during the magnetic treatment. It can be added on the ballasted-sludge cake surface by injection, dripping, misting, nebulisation or by any other suitable method.

Typically, the method consists of adding a sludge-conditioning agent directly on the ballasted-sludge cake surface, and then pulsing the magnetic field induced by the magnets.

The chemical effect of the sludge-conditioning agent paired with the magnetic treatment creates a sludge cake flocculation effect that facilitates the water extraction from the ballasted-sludge cake. It also acts like a mechanical dewatering system. This combination allows the sludge cake TS content to be increased to around 14±1%.

For instance, reference is made to Table 2, consisting of results demonstrating the effect of cationic dry polymer added per kg of dry solids of sludge cake during the conditioning step where the sludge cake is subject to magnetic treatment (in this example, in the form of magnetic pulses).

phase. This results in a reduction of the water content of the sludge without having to add additional sludge treatment equipment (large machines, e.g. filter press, band filter,

TABLE 2 effect of sludge-conditioning agent paired with magnetic treatment on sludge-cake volume (second laboratory experiment)

| Wastewater characteristics | | Magnet characteristics | | | | |
|---|---|---|---|---|---|---|
| Total phosphorus ≈ 3.3 mg P/L | | Shape: rectangular (40 mm × 40 mm × 10 mm) | | | | |
| TSS ≈ 130 mg/L | | Weight: 120 g | | | | |
| COD ≈ 130 mg $O_2$/L | | Magnetic field strength: 0.248 Tesla | | | | |
| | | Pull Force: 27 kg | | | | |
| Tests | #1 | #2 | #3 | #4 | #5 | #6 |
| Magnetic treatment | No | Yes | Yes | Yes | Yes | Yes |
| Wastewater treatment additives | | | | | | |
| Coagulant (alum) (mg AL/L): | 11.6 | 11.6 | 7.0 | 7.0 | 11.6 | 11.6 |
| Anionic polymer (mg/L): | 1.0 | 1.0 | 0.5 | 1.0 | 1.0 | 1.0 |
| Iron particles (g/L): | 1.0 | 1.0 | 1.0 | 1.0 | 1.0 | 1.0 |
| Sludge conditioning agent | | | | | | |
| Cationic polymer (g/kg dry solids): | 0 | 0 | 6.8 | 7.4 | 6.5 | 6.2 |
| Results | | | | | | |
| TS content (% dry solids): | 2.5 | 6.2 | 15.0 | 13.6 | 13.4 | 14.2 |
| Extracted water clarity (qualitative): | No water | Acceptable | Excellent | Excellent | Excellent | Excellent |
| Solids capture rate (qualitative): | — | Moderate | High | High | High | High |
| Approximate volume reduction | | | | | | |
| Sludge-cake reduction (%): | — | 61.2 | 85.5 | 83.7 | 83.4 | 84.5 |
| Sludge-cake water reduction (%): | — | 59.7 | 83.3 | 81.6 | 81.3 | 82.4 |

TSS: Total suspended solids;
COD: Chemical oxygen demand

The sludge cake was formed with an anionic polymer (0.5 or 1.0 mg/L) used in water treatment as a flocculant. The sludge cakes also contain a coagulant (7.0 or 11.6 mg Al/L) and iron particles as a ballast (1.0 g/L).

The magnetic pulses were created using an exemplary neodymium magnet of a polygonal shape of 40 mm*40 mm*10 mm, with a weight of 120 g, a magnetic field strength of 0.248 tesla, and a pull force of 27 kg. It is shown in Table 2 that the TS content of the ballasted sludge cake is around 2.5% without the sludge-conditioning agent and without magnetic treatment, and increases to around 14%±1% with excellent extracted water clarity and high solids capture rate following the application of the sludge-conditioning agent and the magnetic treatment (tests #3, #4, #5 and #6).

As shown in Table 2, the combination of applying the magnetic treatment to a sludge cake that is treated with a conditioning agent (tests #3, #4, #5 and #6) results in a significant sludge cake volume reduction (83 to 85%), and sludge cake water reduction (81 to 83%) when compared to a sludge cake that is not subject to magnetic treatment without the addition of the conditioning agent (test #1).

Moreover, as shown with respect to the results presented in Table 1, the addition of the conditioning agent equally provides a better sludge cake volume reduction (and better sludge cake water reduction) when compared to the sludge cake subject to the magnetic treatment without the addition of the conditioning agent (test #2). The addition of the conditioning agent to the sludge cake prior to or during the applying of the magnetic treatment results in the significant volume reduction of the sludge cake (and significant water volume reduction of the sludge cake).

Moreover, the magnetic treatment may be performed using the same equipment as that used during the separation phase. This results in a reduction of the water content of the sludge without having to add additional sludge treatment equipment (large machines, e.g. filter press, band filter, centrifuge, etc.) specifically for extracting the water from the sludge, as the magnetic source is sufficient (when the conditioning agent is added) to extract the water from the sludge cake. As such, the same equipment used for the sludge separation stage may be used to extract a significant amount of the water from the sludge cake (to achieve, e.g., around 14%±1% TC of total solid content), avoiding the need for the additional water extraction equipment.

Ballast Recovery

Once the ballasted-sludge cake is dewatered, the ballast is recovered from the ballasted-sludge cake. In order to do so, the ballasted-sludge cake may go through a device 4 that will permit the ballast recovery using a magnetic separation 5 (e.g. using magnetic drum separator). The steps 4 and 5 may be accomplished by only one device. The ballast particles will then go back into the process at the flocculation stage 2. The sludge cake is transported to disposal 12.

In some embodiments, the recovered ballast may be washed with a fluid 13 (e.g. water) inside the device 14. The washing fluid then flows back into the water treatment process (e.g. to the coagulation stage 1) to be treated. The washed recovered ballast is then reintroduced in the flocculation stage 2. It will be understood that the device 3, 4, 5 and may be integrated within only one device.

Although the invention has been described with reference to preferred embodiments, it is to be understood that modifications may be resorted to as will be apparent to those skilled in the art. Such modifications and variations are to be considered within the purview and scope of the present invention.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

What is claimed is:

1. A method of extracting water from sludge during a treatment process of water or sludge comprising:
    adding a magnetic ballast and a flocculant to said water or said sludge, forming flocs in said water or said sludge;
    applying a magnetic field to said water or said sludge, said magnetic field drawing said ballasted flocs to an interface, wherein a ballasted sludge cake is formed on said interface;
    adding a conditioning agent to said ballasted sludge cake, the conditioning agent promoting formation of a porous, free-draining cake structure; and
    applying a plurality of magnetic pulses, each magnetic pulse resulting in a variation in an intensity and an orientation of the magnetic field over a given period, to pulse said ballasted and conditioned sludge cake to extract water from said ballasted and conditioned sludge cake by promoting movement of said ballasted and conditioned sludge cake while said ballasted and conditioned sludge cake is supported by said interface.

2. The method as defined in claim 1, wherein said plurality of magnetic pulses includes four or more magnetic pulses.

3. The method as defined in claim 1, further comprising adding a coagulant to said water or said sludge prior to said applying a magnetic field.

4. The method as defined in claim 1, wherein said flocculant consists of:
    anionic polymer;
    cationic polymer;
    inorganic flocculant; or
    a combination thereof.

5. The method as defined in claim 1, wherein said flocculant is added to said water, and said magnetic ballast is added to said flocculated water.

6. The method as defined in claim 1, wherein said conditioning agent is added to said ballasted sludge cake by at least one of injection, dripping, misting and nebulising.

7. The method as defined in claim 1, wherein said conditioning agent may be added to said magnetically-ballasted sludge through the interface.

8. The method as defined in claim 1, wherein said conditioning agent is at least one of an anionic polymer, a cationic polymer and an inorganic polymer.

9. The method as defined in claim 1, wherein said conditioning agent is at least a cationic polymer.

10. The method as defined in claim 1, further comprising, after said applying of said plurality of magnetic pulses, recovering said magnetic ballast using magnetic separation.

11. The method as defined in claim 1, wherein said applying said plurality of magnetic pulses includes repeatedly reducing and increasing said intensity of the magnetic field by turning off or reducing current flowing through at least one electromagnet, and wherein said intensity of said magnetic field may be increased by turning on or increasing current flowing through the at least one electromagnet.

12. The method as defined in claim 1, further comprising recovering said ballast from said ballasted and conditioned sludge cake following said extraction of water from said ballasted and conditioned sludge cake.

13. The method as defined in claim 1, wherein said concentration of magnetic ballast in said ballasted sludge cake is of less than or equal to 20 g of magnetic ballast in a liter of said ballasted sludge cake.

14. A method of extracting water from sludge during a treatment process of water or sludge comprising:
    adding a magnetic ballast, a flocculant and a coagulant to said water or said sludge, forming flocs in said water or said sludge;
    applying a magnetic field to said water or said sludge, said magnetic field drawing said ballasted flocs to an interface, wherein a ballasted sludge cake is formed on said interface;
    adding a conditioning agent that is an anionic or cationic polymer to said ballasted sludge cake, the conditioning agent promoting formation of a porous, free-draining cake structure; and
    applying a plurality of magnetic pulses, each magnetic pulse resulting in a variation in an intensity and an orientation of the magnetic field over a given period, to pulse said ballasted and conditioned sludge cake to extract water from said ballasted and conditioned sludge cake by promoting movement of said ballasted and conditioned sludge cake while said ballasted and conditioned sludge cake is supported by said interface.

* * * * *